United States Patent [19]

Horrocks

[11] 4,071,761
[45] Jan. 31, 1978

[54] METHOD FOR DETERMINING RANDOM COINCIDENCE COUNT RATE IN A SCINTILLATION COUNTER UTILIZING THE COINCIDENCE TECHNIQUE

[75] Inventor: Donald L. Horrocks, Placentia, Calif.

[73] Assignee: Beckman Instruments, Inc., Fullerton, Calif.

[21] Appl. No.: 693,652

[22] Filed: June 7, 1976

[51] Int. Cl.² ............................................... G01T 1/20
[52] U.S. Cl. .................................... 250/369; 250/328; 250/366
[58] Field of Search ....................... 250/366, 328, 369

[56] References Cited
U.S. PATENT DOCUMENTS 3,626,187 12/1971 Laney .................................... 250/366
3,772,512 11/1973 Laney .................................... 250/366

Primary Examiner—Harold A. Dixon
Attorney, Agent, or Firm—Robert J. Steinmeyer; Robert R. Meads

[57] ABSTRACT

A method for the reliable determination of a random coincidence count attributable to chance coincidences of single-photon events which are each detected in only a single detector of a scintillation counter utilizing two detectors in a coincidence counting technique. The method includes the steps of measuring a coincidence count rate as indicated by essentially coincident output pulses from the detectors, measuring a single photon count rate as indicated by output pulses from both of the detectors, whether coincident or not, and determining a random coincidence count rate from the difference between the single photon count rate and the measured coincidence count rate. From the random coincidence count rate thus determined, a percentage error value can be determined, for application, if desired, to subsequently or concurrently measured sample radiation counts.

11 Claims, 4 Drawing Figures

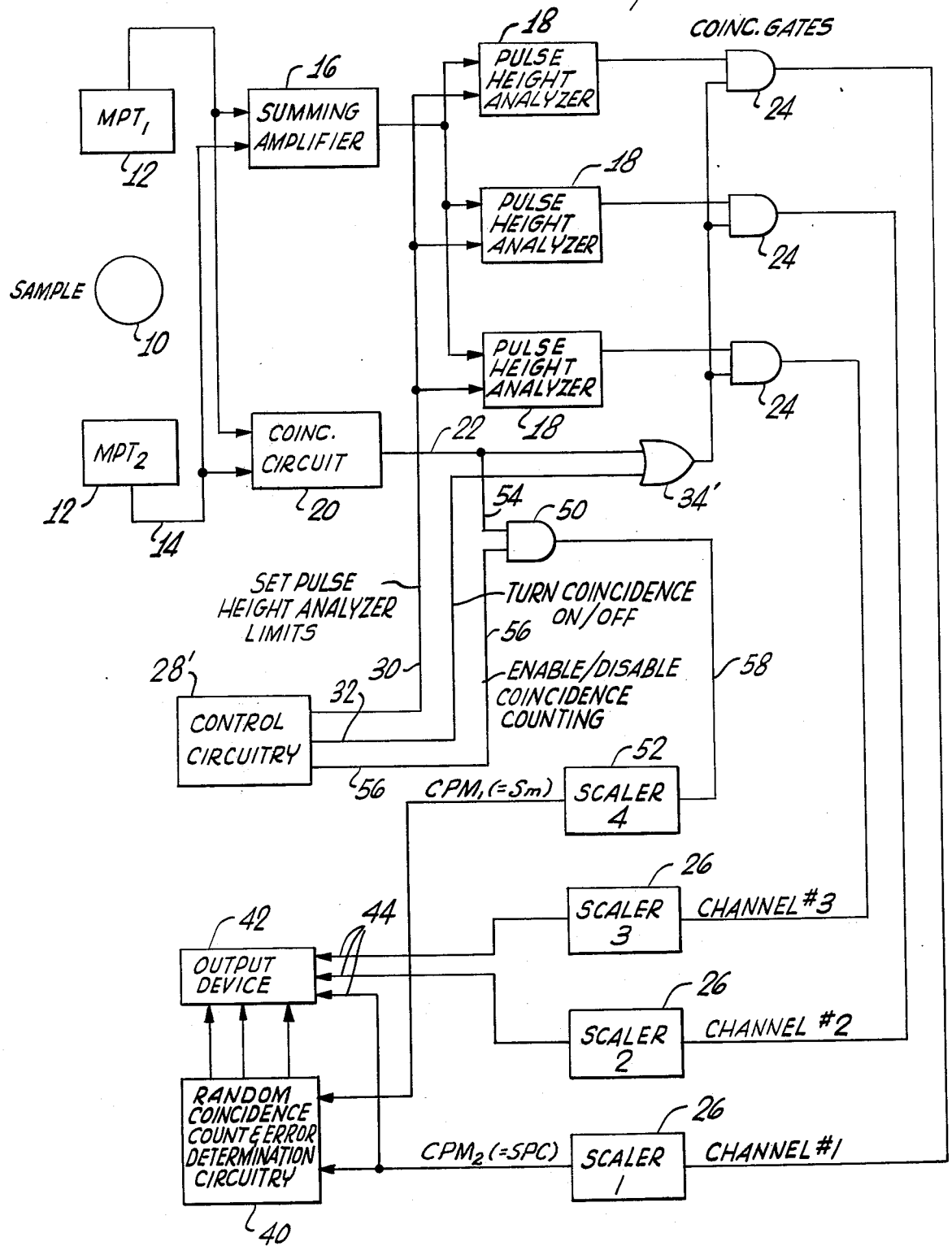

METHOD FOR DETERMINING RANDOM COINCIDENCE COUNT RATE IN A SCINTILLATION COUNTER UTILIZING THE COINCIDENCE TECHNIQUE

BACKGROUND OF THE INVENTION

This invention relates generally to the measurement of radioactivity utilizing what is generally referred to as the coincidence counting technique, wherein events relating to radioactive decay are detected in two or more detectors within a given time interval, in order to eliminate various sources of error which would be introduced if only one detector were used. More particularly, the invention relates to a new and improved method of eliminating a further source of error due to the detection of chance or random coincidences in the multiple detectors.

One of the most widely used devices for the measurement of radiation from radioactive substances is the scintillation counter. The basic element of a scintillation counter is a scintillation medium which absorbs incident radiation and emits photons as a result. Many of the emitted photons are incident upon a photocathode in a nearby multiplier phototube, and are converted to photoelectrons emitted from the photocathode. The electrons emitted from the photocathode are multiplied in number at a succession of phototube electrodes, called dynodes, and the output of the multiplier phototube is a measurable electrical pulse having a magnitude which is approximately proportional to the energy of the incident radiation.

A liquid scintillation counter operates on the same basic principle, except that the scintillation medium is a liquid into which is dissolved, suspended or otherwise intermixed the sample being tested. The radioactivity of the sample can then be measured by collecting the photons emitted from the scintillation medium in a multiplier phototube positioned near the sample, and counting the pulses generated by the tube in appropriate electrical circuitry. Depending on the characteristics of the sample being measured, and on the particular tests being performed, this electrical circuitry usually performs some type of pulse height analysis on the pulse output from the phototube, since it is usually desired to detect and count radioactive events within a particular range or window of energy levels.

A significant problem encountered in the measurement of radioactivity by means of scintillation counters is that there are a number of phenomena unrelated to the radioactivity of the sample which nevertheless result in the generation of output pulses from the multiplier phototube of a scintillation counter. These phenomena are frequently referred to as "singles" events since they are all characterized by the emission of single photons or photoelectrons. A relatively large source of "singles" events is the thermionic emission of electrons from the photocathode or from the dynodes of the multiplier phototube itself. Such electrons are emitted independently of any detected radiation, and can result in significant error, especially if the tubes are operated at relatively high voltages, the typical case where high amplification factors are being used, as in the measurement of relatively low radiation levels. This thermionic emission of electrons is also referred to as "tube noise."

In liquid scintillation counters, the sample itself may emit photons by some process unrelated to its radioactivity. The sample material could exhibit some degree of chemiluminescence, i.e., there may be some chemical reaction or reactions ocurring within the sample material which result in the emission of photons. The sample material may also be subject to the processes of bioluminescence or photoluminescence, which also generate photons independently of the level of radioactivity of the sample material. In addition, the presence of low-level background radiation, static electrical discharges, or a leakage of ambient light into the counter, could give rise to "singles" events detectable by the scintillation counter.

Use of the well known coincidence counting technique substantially reduces the detection of "singles" events by a scintillation counter. In a liquid scintillation counter this technique is utilized by employing at least two multiplier phototubes disposed one on each side of the sample. The emission of many single radioactive particles by the sample can typically result in the emission of about seven or more photons simultaneously, or nearly simultaneously. Thus, there is a high probability that such an event will be detected by both phototubes at nearly the same time. A "singles" event, however, such as one resulting from chemiluminescence, or from a thermionically emitted electron in one of the tubes, would result in an output pulse from only one of the tubes. It can be appreciated, then, that the use of the coincidence counting technique results in the elimination of most of the "singles" events from the counting process.

It will also be apparent, however, that, because of the random nature of the "singles" events, there is a significant probability that a "singles" event could be detected in one tube at nearly the same instant in time that one is detected in the other tube. There is, therefore, a random coincidence rate resulting from random or chance coincidences of unrelated "singles" events. Mathematically, the random coincidence count rate $S_c$ is given by:

$$S_c = 2\tau_c S_1 S_2, \tag{1}$$

where:

$\tau_c$ = the resolving time of the coincidence counter, i.e., the longest time separating two pulses which would still be considered coincident, $S_1$ = the "singles" count rate measured by one of the multiplier phototubes, and $S_2$ = the "singles" count rate measured by the other of the multiplier phototubes.

Under normal operation, a liquid scintillation counter will give a measured count rate ($S_m$) which will be the sum of the sample coincidence count rate ($S_a$) and the "singles" random coincidence count rate ($S_c$). That is:

$$S_m = S_a + S_c \tag{2}$$

Any user of a liquid scintillation counter ideally needs to know the value of $S_c$ so that, where possible, a correction can be made to obtain the correct value of radiation attributable to the sample only. Even where direct correction is not possible, because testing is being performed in specific energy level "windows," the user of the counter could still use the value of $S_c$ as an indication of the reliability of the measured count rate.

Prior to this invention, a precise determination of the random coincidence rate has not been possible. It has only been possible to make a qualitative estimate of the presence of those "singles" events which decrease with time. Usually chemiluminescence, bioluminescence and photoluminescence have this decay characteristic. In accordance with such prior art techniques, the radioactivity of a sample would be measured at different times, and the measured count rates compared so that any decrease in the measured coincidence rates could be noted. If there was little or no decrease in the measured coincidence rates over a substantial time period, it was generally assumed that the random coincidence count was insignificant. This method is, of course, quite time consuming, and does not take into account at all those "singles" events derived from tube noise, or from other sources which do not rapidly decay.

Accordingly, there is a clear need in the field of radioactivity measurement for a coincidence counting technique which provides a reliable estimate of the error attributable to random or chance coincidences of "singles" events, thereby enabling more accurate measurements of radioactivity. The present invention fulfils this need.

SUMMARY OF THE INVENTION

The present invention resides in a method for determining the random coincidence count due to events which generate single quanta of energy which may happen to occur in practically coincident pairs detectable by two independent detectors in a scintillation counter. Briefly, and in general terms, the method comprises the steps of counting the number of measured coincidences or pulses detected essentially simultaneously by both detectors in the scintillation counter, counting the number of pulses detected in both of the detectors, without regard for coincidence, and determining from the results of these counting steps a random coincidence count rate attributable to chance coincidences of single-quantum events.

In the first mentioned counting step, the scintillation counter is used in the usual manner for coincidence counting, i.e., an event has to be detected in both detectors practically at the same time in order for a count to be accumulated. In the second mentioned counting step, however, no coincidence is required between events detected in the two detectors. Counts will be detected and accumulated whether they result from detection in either of the detectors or in both of the detectors simultaneously. This counting step is termed single photon counting, since it will count all of the "singles" events, as well as the coincidence events. An approximate but highly reliable estimate of the "singles" count rate can be determined by subtraction of the results of the two measuring steps and, from the "singles" count rate thus obtained, the random coincidence rate can be determined. Then, a percentage correction can be computed and, if desired, utilized to correct the measured count rate for subsequently or concurrently measured sample radiation rates.

In accordance with one presently preferred technique utilizing the invention, a radioactive sample is first monitored simultaneously in two counting channels, both of which have their lower level energy limits set to zero and their upper level energy limits set to a maximum, so that all pulses are counted. In one of the counting channels, there is an active coincidence gate, so that the channel will measure all of the coincidence counts, i.e., those attributable to the sample itself, and those attributable to chance coincidences. In the second channel, there is no active coincidence gate, so that the second channel will measure the single photon count, or the count of pulses attributable to both "singles" events and "coincidence" events. Counting in the two channels is continued for a preselected time, or until the count reaches a number corresponding with a preselected statistical probability of accuracy. Then the coincidence count rate is determined from the count rates of the two channels, and a percentage correction is calculated. The percentage correction can be reliably applied only to sample rates obtained using a zero lower energy level limit and a maximum upper energy level limit. If other counting windows are used, the percentage correction is best used as an indication of accuracy, although not necessarily an absolute one. The measurements in the two channels can be repeated, if desired, after measuring the radioactivity of the sample in accordance with its desired counting program parameters. If a smaller correction is then obtained, this is indicative of a relatively high "singles" count rate attributable to phenomena, such as chemiluminescence, which decay quite rapidly.

In accordance with another specific technique utilizing the principles of the invention, a single counting channel is utilized for measuring a coincidence count rate and a single photon count rate. Again, the channel is adjusted to detect pulses over wide energy limits. Initially, there is no active coincidence gate in the channel, and the single photon count rate is measured for a short time. Then, the coincidence gate is activated, and the sample radioactivity is measured in the same channel again to obtain a coincidence count rate which includes real and chance coincidences, and in one or more other channels using counting program parameters required for a particular test or tests on the sample. Finally, the coincidence gate is again deactivated, and the single photon count is monitored for a further time. In this particular technique, the coincidence count rate and a corresponding percentage error can be determined for both the starting and ending values of the single photon count rate. Both error values are supplied to the user of the counter, to be applied to the measurement results as the user sees fit.

Other aspects and advantages of the invention will become apparent from the following more detailed description taken in conjunction with the accompanying drawings.

BRIEF DESCRIPTION OF THE DRAWINGS

FIG. 3 is a block diagram similar to FIG. 1, but illustrating an alternate technique for determination of the random coincidence count rate.

DETAILED DESCRIPTION

Figure 1:
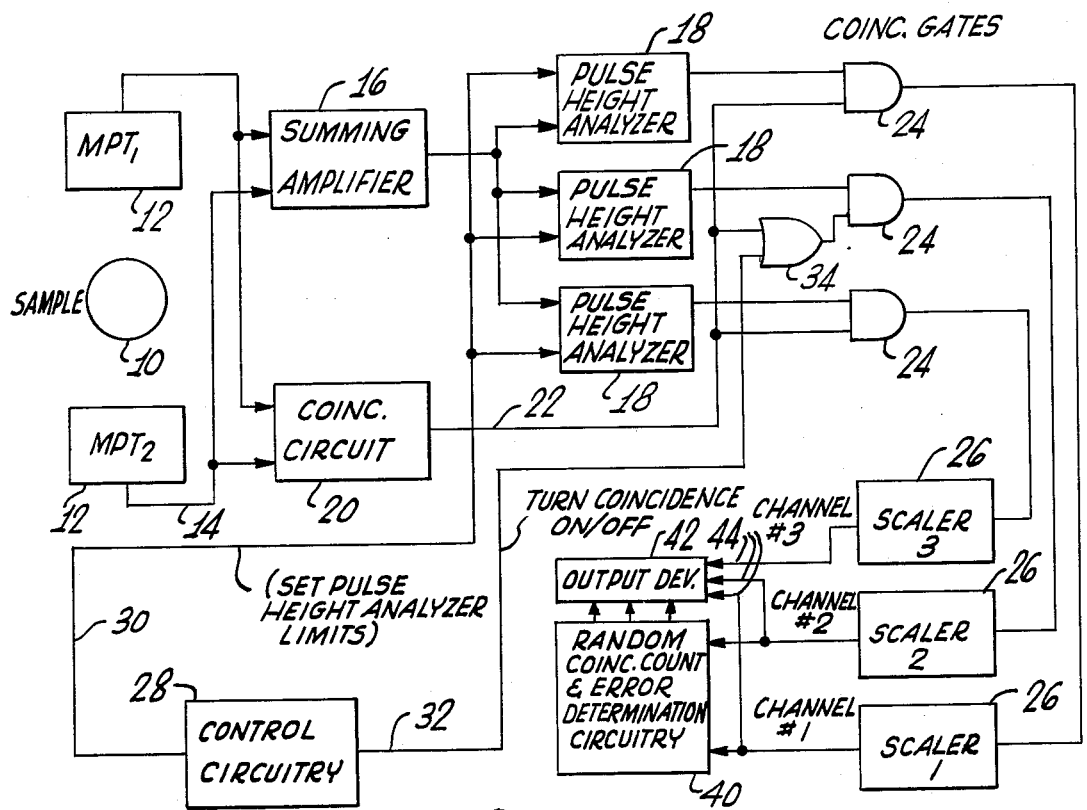
FIG. 1 is a block diagram of a measurement system incorporating a scintillation counter and associated components for practicing the coincidence counting technique in accordance with the principles of the present invention.

Referring now to the drawings, the present invention is principally concerned with a method for determining the error due to chance coincidences detected by utilizing the coincidence counting technique in a scintillation counter. As previously indicated, the coincidence counting technique utilizes at least two radiation detectors, usually multiplier phototubes, in order to avoid counting single-photon events resulting from chemiluminescence or similar phenomena in the sample being measured, or resulting from phototube noise arising from thermionic emission of electrons. Although these "singles" events will normally be detected in only one multiplier phototube, the random nature of their occurrence results in the detection of a significant number of real coincidences which are unrelated to the radioactivity being monitored.

FIG. 1 shows in block diagram form a typical arrangement for radioactivity measurement using a liquid scintillation counter. A sample 10, is placed between a pair of photon detectors 12, which usually take the form of multiplier phototubes. In liquid scintillation counters, radioactive particles emitted by the sample material are absorbed by a liquid scintillation medium mixed with the sample itself, and the generation of a number of photons results from each emission of a radioactive particle. The photons are simultaneously, or nearly simultaneously, detected by the multiplier phototubes 12 and converted into measurable electrical pulses for output on lines 14. The output pulses from the multiplier phototubes 12 are transmitted to a summing amplifier 16, the output of the amplifier being fed to three pulse height analyzers 18, each of which can be adjusted to ignore pulses which do not fall within a selectable range of pulse heights or energy levels. The output pulses from the multiplier phototube 12 are also transmitted to a coincidence detection circuit 20 which provides an output on line 22 if the input pulses from the tubes are in coincidence to within some preselected resolution time interval. The coincidence signal on line 22 and the outputs from the pulse height analyzers 18 are applied to three coincidence gates 24, which function as AND gates, producing an output only when both input signals are in the same selected condition. Three scalers 26 receive output pulses from the respective coincidence gates 24, and accumulate counts in the three channels.

In accordance with the present invention, the sample 10 is measured both to obtain a count of the number of coincidences actually detected by the multiplier phototubes 12, and to obtain a single photon count attributable to single-photon events detected by either of the multiplier phototubes, whether separately or in coincidence. From these two measurements, an estimate of the number of chance coincidences, attributable to single-photon events, can be determined, and from this value, a correction for the count rate of the sample can be obtained.

As used herein, the expression "essentially in coincidence" refers to a pair of pulses, one from each of the phototubes 12, occurring within a resolving time interval $\tau_c$. A resolving time of thirty nanoseconds is typical for liquid scintillation counters.

In the scintillation counter illustrated in FIG. 1, control circuitry 28, which is employed to provide control signals on line 30 to set upper and lower limits on the pulse height analyzers 18, is also adapted to provide a further control signal on line 32 to control the coincidence gate 24 associated with the counting channel designated channel #2. This control feature is shown diagrammatically as an OR gate 34, one input of which is derived from line 32 and the other input of which is derived from output line 22 from the coincidence detection circuit 20. The output of the OR gate 34 is connected as an input to the corresponding coincidence gate 24 for channel #2. Accordingly, when an appropriate control signal, in the form of a logical "one," is supplied on line 32, the channel #2 coincidence gate 24 will be conditioned to pass pulses therethrough, regardless of the condition of the coincidence detection circuit 20. When the signal on line 32 is a logical "zero," the coincidence detection circuit 20 will function as usual to control operation of the channel #2 coincidence gate 24.

It will be appreciated that the control circuitry 28 is not essential to the invention, since the same functions it performs could be effected by manual switching operations. However, if the invention is to be practiced in the measurement of radioactivity from a large number of samples in sequence, it would be preferable to utilize automatic control circuitry to perform these switching operations.

From equation (2), the measured count rate is given by the expression:

$$S_m = S_a + S_c \qquad (2)$$

When the coincidence gate 24 associated with channel #2 is deactivated, i.e., all pulses are allowed to pass, the resulting single photon count (SPC) is given by the expression:

$$SPC = (S_1 - S_c) + (S_2 - S_c) + S_m \qquad (3)$$

However, it can readily be shown that, even for very high values of "singles" counts, $S_1$ and $S_2$, the value of $S_c$ is only a very small fraction of $S_1$ or $S_2$, and can, for all practical purposes, be neglected in the expression for SPC. For example, if the "singles" counts $S_1 = S_2 = 2.5 \times 10^6$ counts per minute, and if the resolution time $\tau_c = 0.5 \times 10^{-9}$ minute, then $S_c$ can be computed from equation (1) as 6,250 counts per minute, i.e., 0.25% of $S_1$ or $S_2$. Accordingly, the expression (3) can be approximated:

$$SPC = S_1 + S_2 + S_m \qquad (4)$$

Since "singles" events resulting from multiplier phototube noise and other source will probably affect both phototubes equally, it can be assumed that $S_1 = S_2$. Therefore:

$$S_1 = S_2 = \tfrac{1}{2}(SPC - S_m). \qquad (5)$$

Then $S_c$ can be computed from:

$$S_c = 2\tau_c S_1 S_2 = (\tau_c/2)(SPC - S_m)^2. \qquad (6)$$

In accordance with one specific technique utilizing the principles of the invention, the values of SPC and $S_m$ are measured simultaneously prior to an actual sample count with desired parameters, i.e., prior to a count for a designated time, using designated level settings of counting windows, error values and other parameters. The values of SPC and $S_m$ are measured in channels #1 and #2 of FIG. 1. In both of these channels the lower pulse height discriminator level is set to zero and the upper discriminator level is set to the maximum available, so that all pulses are counted by both of these channels. Channel #1 will measure the value of $S_m$ and channel #2 will measure the value of SPC, since a logical "one" signal is provided over line 32 to disable the channel #2 coincidence gate. The third channel is not used in the measurement of $S_m$ and SPC, but could be used for simultaneous measurement with other pulse height window settings. If the number of counts per minute recorded in channel #1 is indicated as $CPM_1$ and the number of counts per minute recorded in channel #2 is indicated as $CPM_2$, the value of $S_c$ can be calculated from equation (6):

$$S_c = (\tau_c/2)(CPM_2 - CPM_1)^2.$$

Then the value of $S_a$ can be obtained by transposing equation (2):

$$S_a = CPM_1 - S_c,$$

and the percentage correction can be calculated from:

$$\% \text{ correction} = (S_c/S_a) \cdot 100 = (S_c/CPM_1 - S_c) \cdot 100 \quad (7)$$

Alternatively, the correction can be computed as a percentage of the measured coincidence rate $S_m$. A sample count rate taken using designated measurement parameters can then be corrected, if desired, using the percentage correction obtained above. Correction of a sample count rate in this manner can be reliably made only if the sample measurement parameters include a zero lower energy level setting and a maximum upper energy level setting. Otherwise, the percentage correction is best used as an approximate measure of reliability.

The apparatus shown in FIG. 1 also includes circuitry 40 connected to the channel #1 and channel #2 scalers 26, for determining the coincidence count rate $S_c$ and the percentage correction value, in accordance with equations (6) and (7), respectively. These values can then be transferred to an output device 42, such as a printer, for use in the analysis of other radiation measurements relating to the same sample. The detailed design of this circuitry 40 is not critical to the invention, and can be implemented in either analog or digital form, using conventional components connected to perform the required manipulations of the signals. As shown by lines 44, the scalers 26 are also capable of being coupled to the output device 42, when all three channels are used in a conventional manner.

Table 1, which follows, lists some typical counting data from channels #1 and #2, together with the calculated values of the $S_c$, $S_a$ and the percentage correction.

TABLE 1

| $CPM_1$ | $CPM_2$ | $S_c$ | $S_a$ | % Correction |
|---|---|---|---|---|
| 50.0 | 50,000 | 0.6 | 49.4 | 1.21 |
|  | 100,000 | 2.5 | 47.5 | 5.26 |
|  | 200,000 | 10.0 | 40.0 | 25.0 |
| 100.0 | 50,000 | 0.6 | 99.4 | 0.60 |
|  | 100,000 | 2.5 | 97.5 | 2.56 |
|  | 200,000 | 10.1 | 90.0 | 11.11 |
|  | 500,000 | 62.5 | 37.5 | 166.67 |
| 1,000 | 50,000 | 0.6 | 999.4 | 0.06 |
|  | 100,000 | 2.5 | 997.5 | 0.25 |
|  | 500,000 | 62.3 | 937.7 | 6.25 |
|  | 1,000,000 | 250.0 | 750.0 | 33.33 |
| 10,000 | 50,000 | 0.4 | 9999.6 | 0.004 |
|  | 100,000 | 2.0 | 9998.0 | 0.02 |
|  | 1,000,000 | 234.0 | 9755.0 | 2.51 |
|  | 5,000,000 | 6250.0 | 3750.0 | 166.67 |
| 100,000 | 500,000 | 40.0 | 99,960.0 | 0.04 |
|  | 1,000,000 | 202.0 | 99,798.0 | 0.20 |
|  | 5,000,000 | 6002.0 | 93,998.0 | 6.39 |
| 1,000,000 | 2,000,000 | 250.0 | 999,750.0 | 0.025 |
|  | 5,000,000 | 4000.0 | 996,000.0 | 0.40 |

Figure 2:
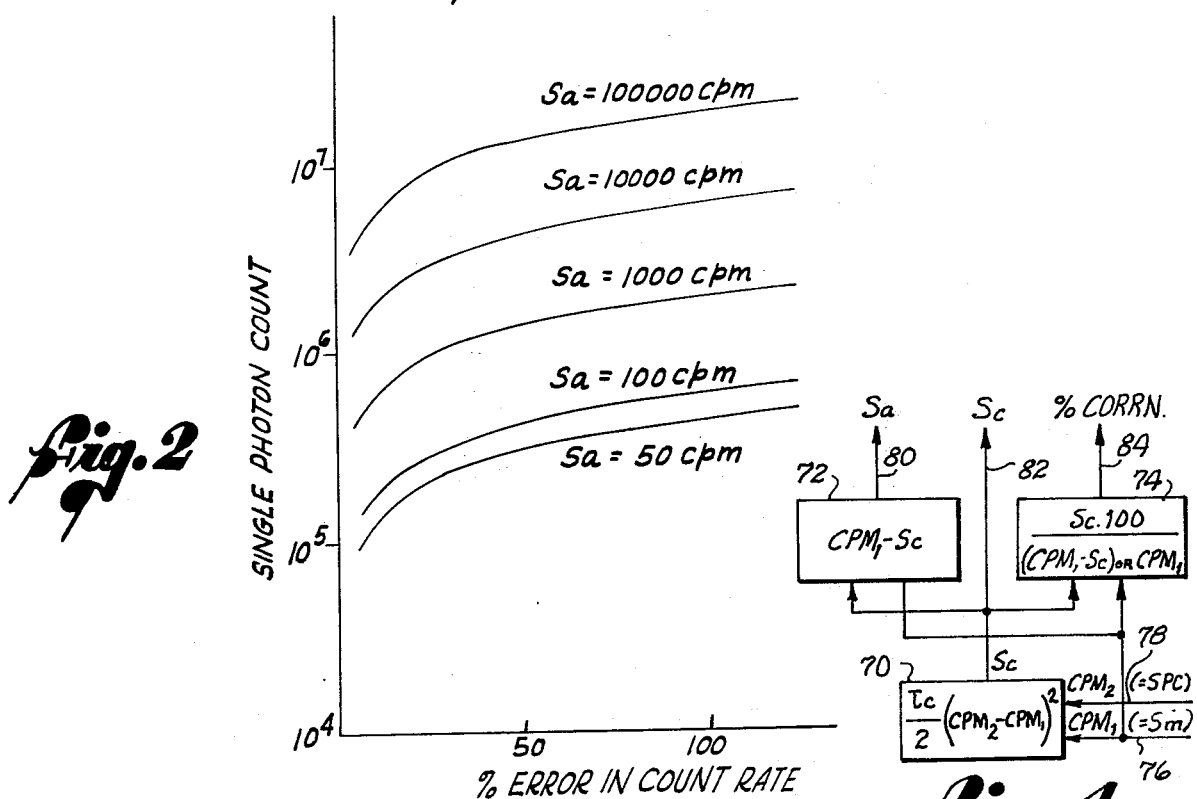
FIG. 2 is a series of graphs showing how the count-rate percentage error due to random coincidences varies in relation to the single photon count and to the actual count rate of the sample.

FIG. 2 shows the variation in percentage error due to chance coincidences as the single photon count and the sample count $S_a$ are varied. The curves plotted in FIG. 2 illustrate the necessity of evaluation of the random coincidence count rate, especially when high "singles" rates obtain, or low sample count rates are being measured.

In accordance with another specific technique employing the principles of the present invention, a dedicated counting channel is utilized to monitor both the values of $S_m$ and the value of SPC. According to this method, one of the counting channels, such as channel #2 in the FIG. 1 apparatus, is set wide open, i.e., with the lower discriminator level at zero and the upper discriminator level at its maximum. Initially, coincidence gating is disabled by the presence of a logical "one" signal on line 32, and the single photon count rate (SPC) is measured for a relatively short period of time in channel #2. This rate can be designated a pre-count single photon count, $SPC_1$. Then, the coincidence gating is enabled by the presence of a logical "zero" signal on line 32, and the sample is measured in channel #2 and in other channels, if desired, for a preselected time or until a preselected statistical error in the count rate is attained. The count rate obtained in channel #2 with the coincidence gating enabled is $S_m$. Finally, the coincidence gating in channel #2 is disabled again, and the SPC count rate is again measured. This rate can be designated a post-count single photon count, $SPC_2$. Pre-count and post-count percentage error values are then computed as follows:

$$S_{c1} = (\tau c/2)(SPC_1 - S_m)^2, \text{ from equation (6)},$$

$$\% \text{ error (1)} = (S_{c1}/S_m - S_{c1}) \cdot 100, \text{ from equation (7)},$$

$$S_{c2} = (\tau c/2)(SPC_2 - S_m)^2, \text{ from equation (6), and}$$

$$\% \text{ error (2)} = (S_{c2}/S_m - S_{c2}) \cdot 100, \text{ from equation (7)}.$$

Both of the error values are presented to the user of the counter so that appropriate action may be taken in correcting the measured radiation counts, or in assessing the reliability of the measured counts. Again, the error can be computed as a percentage of the measured coincidence rate $S_m$, if desired.

The following are examples of error calculations utilizing the last-described technique:

SAMPLE 1

$SPC_1$ (0.5 min): 500,000 cpm
$S_m$: 897 cpm
$SPC_2$ (0.5 min): 255,000 cpm $\% \text{ error (1)} = (62/897 - 62) \times 100 = 7.42\%$ $\% \text{ error (2)} = (16/897 - 16) \times 100 = 1.82\%$

SAMPLE 2

$SPC_1$ (0.5 min): 50,000 cpm
$S_m$: 1,510 cpm
$SPC_2$ (0.5 min): 50,800 cpm $\% \text{ error (1)} = (0.6/1,510 - 0.6) \times 100 = 0.04\%$ $\% \text{ error (2)} = (0.6/1,510 - 0.6) \times 100 = 0.04\%$ In the system illustrated in FIG. 1, at least one channel has to be essentially dedicated for use in determining the random coincidence count rate. In one of the aforedescribed techniques, channel #2 is used to record the single photon count rate and channel #1 is used to record the measured coincidence count rate $S_m$. In the other of the aforedescribed techniques, channel #2 is used at different times to record the single photon count rate and the measured count rate $S_m$. In neither technique, however, are all three channels ever available for taking test measurements. The embodiment illustrated in FIG. 3 overcomes this disadvantage and makes all three channels available to the user.

The instrument system illustrated in FIG. 3 includes the same basic elements as those depicted in FIG. 1, and identical corresponding reference numerals have therefore been used whereever possible. The principal difference between the figures is that the FIG. 3 embodiment includes a differently connected OR gate 34', an additional AND gate 50 and an additional scaler 52. Control circuitry 28' still generates signals on line 30 to set the pulse height analyzer limits, and generates a control signal on line 32 to turn the coincidence gating on and off. However, the OR gate 34' is connected with line 22 from the coincidence detection circuit 20 as one of its inputs, with the line 32 as its other input, and with its output connected to all three coincidence gates 24. Thus, when a logical "one" control signal is supplied on line 32, all of the coincidence gates 24 are enabled or conditioned to pass pulses therethrough. Any of the channels can, therefore, be utilized to obtain a single photon count prior to, or following, the taking of test measurements. In FIG. 3, the scaler associated with channel #1 is shown as being connectable to the random coincidence count and error determination circuitry 40, for the transmission of a single photon count thereto.

In the embodiment shown in FIG. 3, the output signal from the coincidence detection circuit 20, on line 22, is also connected as an input to the AND gate 50, as shown at 54. Another input to the AND gate 50 is supplied over line 56 from the control circuitry 28'. So long as a logical "one" control signal is present on line 56, the coincidence signals on line 22 will be gated through the AND gate 50, and thence over line 58 to the additional scaler 52.

It can be seen from FIG. 3 that, by supplying a logical "one" control signal on line 56 at the same time that the test measurements are being taken, all three channels can be utilized for test measurements while the additional scaler 52 is accumulating a count of real or measured coincidences, i.e., is measuring $S_m$. The coincidence count accumulated in the additional scaler 52 is also transmitted to the random coincidence count and error determination circuitry 40 for processing in accordance with equations (6) and (7).

Figure 4:
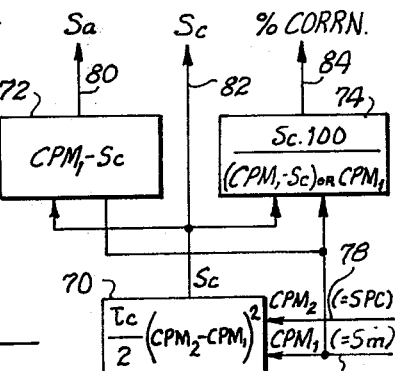
FIG. 4 is a block diagram showing the functions of random coincidence count and error determination circuitry of FIGS. 2 and 3.

FIG. 4 shows in more detail the functions performed by the random coincidence count and error determination circuitry 40. As already mentioned, the circuitry 40 performs the computations defined by equations (6) and (7), and also utilizes equation (2). Basically, the circuitry 40 includes three arithmetic computation circuits 70, 72 and 74, two input signal lines 76 and 78, and three output signal lines 80, 82 and 84. The input signal lines 76 and 78 transmit values of $CPM_1$ and $CPM_2$, respectively to the first computation circuit 70, where the value of $S_c$ is derived in accordance with equation (6). The computed value of $S_c$ is output on line 82 and is also connected to the second and third computation circuits 72 and 74. In the second computation circuit 72, the value of $S_a$ is computed from equation (2) and is output on line 80, and in the third computation circuit 74, the value of a percentage correction is computed in accordance with equation (7) and output on line 84. As has also been explained, the percentage correction may be alternatively computed as a percentage of $S_m$ ($CPM_1$) rather than as a percentage of $S_a$.

It will be appreciated that the signals on input lines 76 and 78 may be derived from any selected counting channel, depending upon which embodiment of the invention is being practiced. In relation to FIG. 1, for example, $CPM_2$, the single photon count, is derived from channel #2, and $CPM_1$, the measured count rate $S_m$, may be derived either from channel #1 or channel #2. In relation to FIG. 3, $CPM_1$ is derived from scaler #4 and $CPM_2$ is derived from channel #1.

It will be appreciated from the foregoing that the present invention represents a significant advance in the field of radiation measurement utilizing the coincidence counting technique. In particular, the method of the invention allows the reliable estimation of a random coincidence count attributable to chance coincidences of single-photon events, and the further computation of a percentage correction or error value for optional application to subsequent or concurrent sample counting measurements. It will also be appreciated that, although two specific techniques have been described in detail for purposes of illustration, various modifications may be made to these techniques without departing from the spirit and scope of the invention. Accordingly, the invention is not to be limited except as by the appended claims.

I claim:

1. For use with a scintillation counter utilizing at least two detectors in a coincidence counting technique, a method for determining a random coincidence count due to events resulting in single-quantum emissions which may chance to occur in such a manner that pairs of essentially coincident single-quantum events are detected one in each detector and are erroneously counted as radioactive disintegrations occurring in a sample, said method comprising the steps of:
    counting the number of essentially coincident events detected in both detectors of the counter;
    counting the number events detected in both detectors, regardless of coincidence in time; and
    determining from the results of said counting steps a random coincidence count rate attributable to chance coincidences of single-quantum events in accordance with the expression $$S_c = (\tau c/2)(CPM_2 - CPM_1)^2,$$

where:
    $S_c$ = random coincidence count rate,
    $\tau_c$ = coincidence resolving time, which is the longest time by which events can be separated and still considered coincident,
    $CPM_2$ = counts per minute recorded in said second counting steps, and
    $CPM_1$ = counts per minute recorded in said first counting step.

2. A method as set forth in claim 1, and further including the steps of:
    determining a sample count rate by subtracting the random coincidence count rate from the measured coincidence count rate recorded in said first counting step; and determining from the random coincidence count rate a proportional correction, for application to other measurements of radiation from the sample, by dividing the random coincidence count rate by the measured coincidence count rate.

3. For use with a scintillation counter utilizing at least two detectors in a coincidence counting technique for the measurement of radiation from a sample, a method for determining a random coincidence count due to chance coincidences of events detectable by only one detector, said method comprising the steps of:

measuring in a first counting channel a radiation rate $CPM_1$ attributable to practically coincident output pulses from two detectors;

measuring simultaneously in a second counting channel a single photon count rate $CPM_2$ attributable to events each of which gives rise to an output pulse from one of the detectors; and determining from said measuring steps a random coincidence count $S_c$, in accordance with the expression $$S_c = (\tau_c/2)(CPM_2 - CPM_1)^2,$$

where $\tau_c$ is the longest time by which pulses can be separated and still considered coincident.

4. A method as set forth in claim 3, and further including the steps of:

determining a sample count rate $S_u$ from the expression $$S_u = CPM_1 - S_c;$$ and determining a proportional correction, by dividing $S_c$ by $S_u$, for application to other measurements of radiation from the sample.

5. A method as set forth in claim 4, wherein all of said method steps are performed both before and after a test measurement of sample radiation made in accordance with desired test parameters, in order to obtain values of the random coincidence count rate and the proportional correction before and after the test measurement.

6. For use with a scintillation counter utilizing at least two detectors in a coincidence counting technique for the measurement of radiation from a sample, a method for determining a random coincidence count rate due to chance coincidences of events detectable by only one detector, said method comprising the steps of:

measuring in a dedicated counting channel a single photon count rate $SPC_1$ attributable to events each of which gives rise to an output pulse from one of the detectors;

then measuring in the same counting channel a coincidence count rate $S_m$ attributable to practically coincident output pulses from the two detectors;

measuring in separate counting channels, simultaneously with said step of measuring $S_m$, radiation count rates obtained from the sample in accordance with desired test parameters;

then again measuring in the dedicated channel a single photon count rate $SPC_2$; and determining a pre-count random coincidence count rate $S_{c1}$ and a post-count random coincidence count rate $S_{c2}$ from the expressions $$S_{c1} = (\tau_c/2)(SPC_1 - S_m)^2 \text{ and}$$

$$S_{c2} = (\tau_c/2)(SPC_2 - S_m)^2.$$

7. A method as set forth in claim 6, and further including the step of determining a pre-count proportional error and a post-count proportional error by dividing the random coincidence count rates $S_{c1}$ and $S_{c2}$ by sample count rates given by the expressions $(S_m - S_{c1})$ and $(S_m - S_{c2})$, respectively.

8. A method as set forth in claim 6, and further including the step of determining a pre-count proportional error and a post-count proportional error by dividing the random coincidence count rates $S_{c1}$ and $S_{c2}$ by the measured coincidence count rate $S_m$.

9. For use with a scintillation counter utilizing at least two detectors in a coincidence counting technique for the measurement of radiation from a sample, a method for determining a random coincidence count rate due to chance coincidences of events detectable by only one detector, said method comprising the steps of:

measuring in a first counting channel a single photon count rate $SPC_1$ attributable to events each of which gives rise to an output pulse from one of the detectors;

then measuring in a dedicated counting channel a coincidence count rate $S_m$ attributable to practically coincident output pulses from the two detectors while measuring in said first and other separate counting channels radiation count rates obtained from the sample in accordance with desired test parameters;

then again measuring in said first channel a single photon count rate $SPC_2$; and determining a pre-count random coincidence count rate $S_{c1}$ and a post-count random coincidence count rate $S_{c2}$ from the expressions $$S_{c1} = (\tau_c/2)(SPC_1 - S_m)^2 \text{ and}$$
$$S_{c2} = (\tau_c/2)(SPC_2 - S_m)^2.$$

10. A method as set forth in claim 9, and further including the step of determining a pre-count proportional error and a post-count proportional error by dividing the random coincidence count rates $S_{c1}$ and $S_{c2}$ by sample count rates given by the expressions $(S_m - S_{c1})$ and $(S_m - S_{c2})$, respectively.

11. A method as set forth in claim 9, and further including the step of determining a pre-count proportional error and a post-count proportional error by dividing the random coincidence count rates $S_{c1}$ and $S_{c2}$ by the measured coincidence count rate $S_m$.

* * * * *